United States Patent Office 2,712,539
Patented July 5, 1955

2,712,539

METHOD OF MANUFACTURING SOYBEAN PROTEIN

Charles T. Nugent and Jerome W. Kaucher, Cincinnati, Ohio, assignors to The Buckeye Cotton Oil Company, Memphis, Tenn., a corporation of Ohio No Drawing. Application April 28, 1953,
Serial No. 351,749

16 Claims. (Cl. 260—123.5)

This invention relates to a method of producing a substantially unhydrolyzed soybean protein and has as its principal object the preparation of unhydrolyzed protein in dry form characterized by substantially complete solubility upon dispersion in weakly alkaline solutions.

Extraction of protein from protein-containing seed material by means of aqueous alkaline solution to produce a substantially unhydrolyzed protein is well known. In all of the known processes, however (e. g. U. S. 2,451,659 to Francis E. Calvert, granted October 19, 1948), the final product is not ordinarily suitable for use in all of the various fields in which protein is employed.

In the field of paper coating for example, when prepared by the methods disclosed in the prior art, unhydrolyzed soybean protein is found to dissolve incompletely in the usual mildly alkaline dispersing mediums and a relativey large amount of insoluble residue is evident. This insoluble residue renders the protein particularly unsatisfactory for paper coating compositions since it gives rise to imperfections which show up as dark spots on the coated paper. In addition, the insoluble portions tend to agglomerate and form masses which accumulate on the screens, doctor blades and other parts of the coating equipment.

If an attempt is made to dissolve such protein more completely, for example by using stronger alkali, solutions are obtained which tend to be highly viscous and set to stiff gels even at relatively low concentrations of protein. In paper coating mills these properties of high viscosity and gel formation in the protein solutions are extremely undesirable since, when such solutions are used in preparing coating compositions, the composition cannot be smoothed out easily and satisfactorily and tends to give the coated product a rough appearance. Morever, additional difficulties are encountered in stirring and transferring such solutions owing to their high viscosity and, when allowed to stand for a time, such solutions set to stiff gels and must either be discarded or can be used only after considerable expense in bringing them back to working consistency.

It has also been found that if, in drying the freshly prepared protein, it is subjected to relatively high temperatures, e. g. 170° F., gel formation of cold alkaline solutions of such protein is very pronounced and there is substantial increase in the amount of insoluble residue when the protein product is redispersed in the mildly alkaline solutions used in the paper coating industry.

We have found that these disadvantages can be substantially eliminated by introducing, during the protein isolation process, an organic material of the group consisting of fatty acids containing from 10 to 18 carbon atoms, natural rosins, water-soluble soaps of said fatty acids, water-soluble soaps of natural rosins, and mixtures of any of these. Such organic materials will hereinafter be termed insolubles inhibitors, or insolubles inhibiting agents.

Francis E. Calvert in U. S. 2,451,659 (referred to above) and U. S. 2,534,227 and 2,534,228, both granted December 19, 1950, has advocated the addition of various organic liquids during the protein isolation at any time prior to drying of the protein curd to produce a white or nearly colorless protein. His agents are however ineffective for reducing the amount of insoluble residue to the desired level for paper-coating applications when the protein is redispersed in mildly alkaline solutions.

We have discovered that an unhydrolyzed protein having a color comparable to that obtained with the process of the Calvert patents referred to above, and, in addition, having substantially complete solubility upon dispersion in weakly alkaline solutions can be produced by the addition during the isolation process of an organic material of the group consisting of fatty acids containing from 10 to 18 carbon atoms, natural rosins, water-soluble soaps of said fatty acids, water-soluble soaps of natural rosins, and mixtures of these.

In the practice of our process in general, substantially oil-free soybean flakes are slurried with an aqueous alkaline solution. The resultant alkaline slurry (pH 7 or higher) is heated to a temperature in the range from about 90° to 120° F. and the extraction of the protein is carried out at a pH up to 10.5, usually for less than an hour. The first extract is usually screened and, if desired, may be centrifuged after the screening operation for further clarification. To insure a better yield, the wet flakes from the first screening operation may then be reslurried with an amount of water equal to about 1.2 times the weight of the wet flakes. The extract from this second operation is usually again screened to separate soybean flakes residue and may, if desired, also be further clarified by centrifuging. The two extracts are then combined and the protein is precipitated from the combined solution. This is usually accomplished by the addition of an acid to bring the solution to the isoelectric range of the protein, although other methods, such as dialysis or salting out, may be used. (It is generally accepted that the isoelectric point of protein may vary with the method used for extraction of the protein and that therefore the isoelectric point may vary from about 4.1 to about 4.8 pH, hence the reference to "isoelectric range.") The precipitated protein curd is then concentrated either by settling or centrifuging and the concentrated curd is then water-washed and filtered at a pH of about 4.6. The filtered curd is then dried and ground to prepare it for further use.

The temperature at which the extracted protein is dried may be varied over a relatively wide range although high temperatures are to be avoided because they tend to increase the amount of material remaining undissolved upon resolution of the protein in accordance with the procedure set forth below. With any given one of the organic materials herein proposed as insolubles inhibitors it is to be appreciated that differing degrees of protection will be obtained at various drying temperatures. A drying temperature of about 170° F. is preferred as the maximum but it is to be understood that the maximum drying temperature is to be controlled so that the amount of material which does not dissolve on dispersion of the protein is not greatly increased.

The organic materials we have proposed as insolubles inhibiting agents may be added at any point in the above described process where the pH of the slurry or solution is sufficient to substantially saponify the particular fatty acid or natural rosin that may be added but not above 10.5 and the temperature is not greater than 120° F. but sufficiently high to give an economically reasonable time for the solubilization of any soap added or for the saponification of any fatty acid or rosin added.

For the realization of optimum results from the process as a whole we prefer to add our agents at any point in the process where the pH of the solution or slurry is from about 8.5 to 10.5 and where the temperature is in the range from about 70° to 120° F. Maximum benefits are believed to be obtained when the aforementioned agents are added to the extract after separation of the soybean flakes within the pH range specified and where the temperature is in the range from about 90 to 120° F.

It is to be understood that a good physical dispersion of the agent in the protein-containing solution or slurry is also necessary to obtain optimum results.

The dried protein produced by the above process exhibits substantially complete solubility upon redispersion in an aqueous alkaline medium containing about 2% of a 15% sodium hydroxide solution and about 10% concentrated ammonium hydroxide (28% $NH_3$), the percentage of the alkaline reagents added being based on the weight of the protein to be redispersed. Such an alkaline solution would have a pH in the range from about 9.0 to 9.5 and would come within the scope of the term "mildly alkaline" as used herein. It is to be appreciated that the dried protein may be also redispersed in various salt solutions and that with salts such as, for example, sodium sulfite and sodium carbonate, a pH of 7 or slightly above, is adequate for redispersion and that such dispersing solutions are also identified by the term "mildly alkaline."

Although we do not wish to be bound by any theory, we believe that the suppression of the formation of insoluble material in the protein isolation process is the result of a physical effect as distinguished from an effect which is the result of a chemical reaction between the insolubles inhibiting agent and the protein.

This theory of physical protection is predicated upon, and is supported by, the following facts.

(a) The water-soluble soaps of fatty acids act in the same way as the pure acids. When the acid is made into a soap, the molecules tend to aggregate into micelles and these scattered localized concentrations of soap molecules would make a large scale reaction with the protein molecules unlikely.

(b) A free fat analysis of the finished protein indicated that the fat content was proportional to the amount of fatty acid added. If the fatty acid were held by a chemical bond it is doubtful that it would be extracted and if it were possible to extract it, it is highly unlikely that it would be extracted in proportion to the amount added.

The organic materials which we have found to be operative for the purpose of our invention are selected from the group consisting of fatty acids, containing from 10 to 18 carbon atoms, natural rosins, water soluble soaps of said acids, water soluble soaps of said natural rosins and mixtures of any of these. In general, any of these agents, or products resulting when such agents are added during the isolation process under the conditions hereinbefore specified, in the amounts in which it is contemplated that such agents will be added, are characterized by substantial solubility at the pH and temperatures prescribed for the points in the isolation process at which the additions are to be made. More specifically, the agents contemplated, or products resulting when the agents are added during the isolation process, are substantially soluble at about 90 to 120° F. in aqueous solutions of about 8.5 to about 10.5 pH, are substantially insoluble at about 90 to 120° F. in aqueous solutions of about 3.5 to 5.5 pH, and are chemically stable and non-volatile at temperatures up to about 170° F.

It is to be understood that the temperature and pH may be varied depending upon the carbon atom chain length and the degree of saturation of the agent.

Examples of the various agents which are effective for the purpose herein specified are:

(1) Capric, lauric, myristic, palmitic, oleic, linoleic and stearic acids as well as the mixture of fatty acids derived from soybean, cottonseed or coconut oil;

(2) Isoresinate 9–L, a modified natural rosin marketed by Filtered Rosin Products of Baxley, Georgia, or any natural rosin suitable for the production of soap;

(3) Water-soluble soaps, e. g. the sodium, potassium and ammonium soaps, of the above fatty acids and of the natural rosins; and (4) Mixtures of any of the above.

These agents are normally added during the isolation process in amounts from about 0.25% to 5.0% by weight of the oil-free soybean material being extracted. Amounts in excess of 5.0% could be used with satisfactory results as regards insolubles inhibition but, as a practical matter, such amounts are not economically justifiable and may, in some cases, give rise to undesirable effects. For example, if too large amounts are added a dilution effect may take place. This may be explained as a reduction, through dispersion in a greater amount of liquid, of the effective protein in the dispersion. The result is a loss in adhesive strength in coating composition prepared from such protein dispersion.

Amounts less than 0.25% may also be used to some advantage but the desired degree of suppression of insolubles formation is seldom realized if such lesser amounts of the agents are used. We normally prefer to add the agents in an amount from about 0.5% to 2.0% by weight of the oil-free soybean material being extracted.

In addition to the reduction in the amount of insoluble residue when protein prepared in accordance with our invention is dispersed in moldly alkaline solutions, other advantages have been unexpectedly realized from the utilization of the aforementioned agents in the protein isolation process. For example, in the isolation process, the anti-foam action of the various agents substantially reduces the amount of actual antifoaming agent which must be used, and, when centrifuges are used to remove the solids from the protein extract, the solids discharge more easily from the centrifuge nozzles because of the lubricating effect of the added agents. Also, the protein product is found to have improved aging properties in that the viscosity of dispersions of the product remain lower and the amount of insoluble material remains lower upon aging of the dispersions as contrasted with dispersions of protein which have been prepared by conventional methods.

In all of the following examples which are to be understood to be illustrative only and to limit the invention in no way, the amount of insoluble material was determined by the following method.

134 ml. of water at room temperature were placed in a 400 ml. container immersed in a water bath and agitated at about 250 to 300 R. P. M. 0.34 gram of sodium sulfite was added to the water in the container to aid in reducing the viscosity of the ultimate protein dispersion (other materials, such as stannous chloride, may also be used for this purpose). To this solution 30 grams of protein, ground to pass a 40 mesh U. S. standard screen, were added. After the protein had been thoroughly mixed with the solution, 3 ml. of concentrated ammonium hydroxide (28% $NH_3$) and 2% by weight of a 15% sodium hydroxide solution, based on the weight of protein being dispersed, were added to the solution, the mixture was then heated with agitation, up to 130° F. within 15 minutes elapsed time and agitation was continued for a total of 30 minutes at a temperature of 130±2° F.

The resultant dispersion was then added to four times its volume of water at room temperature, mixed thoroughly, and screened through a 100 mesh U. S. standard screen. The residue retained by the screen was rinsed by dipping the screen in water at room temperature after which the screen was allowed to drain and the rinse repeated. The washed residue on the screen was then washed into a tared beaker and dried to constant weight at about 220° F. The insoluble material is expressed as a percentage of the original protein going into the dispersion (30 grams).

A 100 mesh U. S. standard screen was chosen as the criterion for determining the effective amount of insoluble residue since any particles of insoluble material larger than 100 mesh size will tend to cause difficulties in paper coating applications.

*Example 1.—Typical blank run.*—3.0 grams of sodium sulfite were added to 4200 ml. of water at 105° F. with agitation, and to the resultant solution 300 grams of substantially oil-free soybean flakes were added. After the flakes were thoroughly wet, 70 ml. of 2½% sodium hydroxide solution were added to the slurry to bring it to a pH of approximately 9.2. The slurry was maintained at a temperature of 105±2° F. and additional amounts of 2½% sodium hydroxide were added, 30 ml. after 10 minutes, and another 15 ml. after 20 minutes. A final adjustment of the solution to a 9.2 pH was made after 28 minutes. Agitation was continued for a total of 30 minutes. The extraction slurry was then screened through a 100 mesh U. S. standard screen.

A second extraction of the screen flakes was made by adding 1400 ml. of water to the flakes, agitating for 5 minutes at 105° F. and again screening the flakes from the extract.

The extracts from the two operations were then combined, an anti-foaming agent was added, and the solids were centrifuged from the liquor. The protein was precipitated from the centrifuged extract by the addition of 7½% sulfuric acid solution to a pH of about 4.6. The precipitated protein curd was allowed to settle and two liters of supernatant liquor was decanted. An amount of water, at room temperature, equal to the amount decanted, was added to the curd, mixed well, and the curd was again allowed to settle. This washing procedure was repeated and after the curd had settled, three liters of supernatant liquor from the second settling was decanted, 0.5 ml. of a commercially available anti-foam agent (e. g. Nalco 71D5 an anti-foam marketed by the National Aluminate Company of Chicago, Illinois) was well mixed with the remaining slurry, and this slurry was then filtered through a Büchner funnel.

The filtered curd was shredded through a 6 mesh U. S. standard screen and dried in a circulating air oven at 145° F. for two hours.

The isolation procedure set forth above was used in all of the following examples as the standard procedure, the only variation being in the addition of the various organic materials for suppression of the formation of insolubles. When a "blank" is indicated, the insolubles matter remaining upon resolution of the protein produced in accordance with the method set forth hereinbefore, is the value used for comparison purposes.

The wide variation in the insolubles of the blank runs in the various examples is due to the variation in quality, e. g. amount of dirt, trash and hulls present in the flakes, prior heat treatment of the flakes, of the particular soybean flakes used in each run.

*Example 2.*—Several extractions were made from a batch of soybean flakes following the procedure of Example 1 except that in each of the runs a different percentage of the mixture of fatty acids derived from coconut oil was added to the centrifuged liquor as the insolubles inhibiting agent.

This addition was carried out as follows:

The centrifuged liquor was heated to 105° F. while being agitated, the coconut fatty acids were added in the percentage desired, and the mixture was then allowed to mix for at least five minutes before the protein was precipitated.

Results appear in the table below.

Table I

| Percent of CNOFA* | On 100 mesh Insolubles | |
|---|---|---|
| | Protein dried at 145° F. | Protein dried at 165° F. |
| 0 | 0.37 | 1.52 |
| 0.5 | .031 | .63 |
| 1.0 | .006 | .017 |
| 2.0 | .002 | .008 |
| 3.0 | .001 | |
| 5.0 | .001 | .001 |

*Coconut oil fatty acids.

*Example 3.*—The procedure of Example 2 was followed except that the mixture of fatty acids derived from cottonseed oil was used in place of the coconut fatty acids as the insolubles inhibiting agent and the isolated protein was dried only at 145° F.

Table II

| Percent CSOFA* | On 100 mesh insolubles |
|---|---|
| 0 (Blank) | 0.37 |
| 1.0 | .002 |
| 2.0 | .010 |
| 5.0 | .005 |

*Cottonseed oil fatty acids.

*Example 4.*—The procedure of Example 3 was followed except that the mixture fatty acids derived from soybean oil was used in place of cottonseed oil fatty acids.

Table III

| Percent SBOFA* | On 100 mesh insolubles |
|---|---|
| 0 (Blank) | 1.52 |
| 1.0 | .010 |
| 2.0 | .006 |

*Soybean oil fatty acids.

*Example 5.*—The procedure of Example 2 was followed except that the insolubles inhibiting agent was varied and added in the form of its sodium soap. The isolated protein in all cases was dried at 145° F.

Table IV

| Insolubles Inhibitor | Percent of Inhibitor | On 100 mesh insolubles |
|---|---|---|
| None (blank) | 0 | 1.26 |
| Capric acid soap | 0.5 | .818 |
| Myristic acid soap | 0.5 | .007 |
| Stearic acid soap | 0.5 | .223 |
| CNOFA soap* | 0.5 | .012 |

*A synthetic composition made up of 7.83% capric acid, 53.8% lauric acid, 19.6% myristic acid, 9.84% palmitic acid, 2.23% stearic acid and 6.7% oleic acid.

*Example 6.*—The procedure of Example 5 was followed, the insolubles inhibiting agent being again varied and added in the form of sodium soaps.

Table V

| Insolubles Inhibitor | Percent of Inhibitor | On 100 Mesh insolubles |
|---|---|---|
| None (blank) | 0 | .529 |
| Palmitic acid soap | 0.5 | .017 |
| Oleic acid soap | 0.5 | .009 |
| Lauric acid soap | 0.5 | .011 |
| CNOFA soap | 0.5 | .005 |

*Example 7.*—The procedure of Example 2 was followed except that the insolubles inhibiting agent was varied and added in varying amounts as may be seen in the table below. Drying of the isolated protein was accomplished at 145° F.

*Table VI*

| Insolubles Inhibitor | On 100 mesh insolubles | | |
|---|---|---|---|
| | .25% Inhibitor | .50% Inhibitor | 1.00% Inhibitor |
| None (Blank) | .14 | .14 | .14 |
| Capric acid | .008 | .046 | .005 |
| Lauric acid | .007 | .009 | .008 |
| Myristic acid | .008 | .006 | .007 |
| Palmitic acid | .080 | .009 | .011 |
| Oleic acid | .007 | .007 | .005 |
| Stearic acid | .023 | .011 | .023 |

*Example 8.*—The procedure of Example 2 was followed except that linoleic acid was used in place of the coconut oil fatty acids as the insolubles inhibitor. The isolated protein was dried at 145° F.

*Table VII*

| Insolubles Inhibitor | On 100 mesh insolubles |
|---|---|
| None (Blank) | .018 |
| .5% linoleic acid | .007 |

*Example 9.*—The procedure of Example 2 was followed using Isoresinate 9-L as the insolubles inhibitor in place of the coconut oil fatty acids. The isolated protein was dried at 145° F.

| Insolubles Inhibitor | On 100 mesh insolubles |
|---|---|
| None (blank) | .280 |
| 0.25% Isoresinate 9-L | .009 |
| 0.50% Isoresinate 9-L | .015 |

*Example 10.*—The procedure of Example 2 was followed using tall oil as the insolubles inhibitor in place of the coconut oil fatty acids. The isolated protein was dried at 155° F.

| Insolubles Inhibitor | On 100 mesh insolubles |
|---|---|
| None (blank) | 1.73 |
| 0.5% Tall oil | .831 |

It may readily be seen from the foregoing examples that a very marked decrease in the amount of insoluble residue can be obtained with the process of our invention, and it is to be understood that insolubles inhibiting agents, other than those specifically set forth in the foregoing examples, and falling within the classes herein mentioned, may be substituted in those examples with comparable results.

The details of the alkaline extraction procedure form per se no part of the invention and may be varied widely, within such limits as are specified hereinafter, for the purposes of the invention as outlined herein. The essence of the invention resides in the selection and use in effective amount, in conventional alkaline extraction of soybean protein, of improving agents of the classes designated herein. The use of various other extraction, addition, and improving agents which do not interfere with or destroy the effectiveness of the insoluble inhibitors of the present invention is, of course, contemplated.

Having thus described the invention, what we claim is:

1. In a method for isolating, from soybean material, a substantially unhydrolyzed protein characterized primarialy by a low insoluble residue upon dispersion in mild aqueous alkali, the steps which comprise treating substantially oil-free protein-containing soybean material with an alkaline solution at a pH up to 10.5 and at a temperature in the range from about 70° to 120° F. to extract the protein in a substantially unhydrolyzed condition, separating the solution from the residue, reducing the pH of the solution to the isoelectric range of the protein to precipitate the protein therefrom, washing the precipitated protein, and adding to the proteinaceous material, in an amount from 0.25% to 5.0% by weight of the protein, an organic material selected from the group consisting of fatty acids containing from 10 to 18 carbon atoms, natural rosins, water-soluble soaps of said acids, water-soluble soaps of said natural rosins, and mixtures thereof, the said organic material being added at any stage in the isolaton process where the alkaline protein-containing solution has a pH not greater than 10.5 and when the temperature is not greater than 120° F.

2. In a method for isolating, from soybean material, a substantially unhydrolyzed protein characterized primarily by a low insoluble residue upon dispersion in mild aqueous alkali, the steps which comprise treating the substantially oil-free protein-containing soybean material with an alkaline solution at a pH up to 10.5 and at a temperature in the range from 90° to 120° F. to extract the protein in a substantially unhydrolyzed condition, separating the solution from the residue, reducing the pH of the solution, by the addition of acid, to the isoelectric range of the protein to precipitate the protein therefrom, washing the protein, and adding to the proteinaceous material, at any stage in the process where the temperature is in the range from 90° to 120° F. and the pH of the protein-containing solution is from 8.5 to 10.5, in an amount from 0.25 to 5.0% by weight of the protein, an organic material selected from the group consisting of fatty acids containing from 10 to 18 carbon atoms, natural rosins, water-soluble soaps of said acids, water-soluble soaps of said natural rosins, and mixtures thereof.

3. The method of claim 2 wherein the alkaline protein-extracting medium is a sodium hydroxide solution.

4. The method of claim 2 wherein the alkaline protein-extracting medium is a sodium hydroxide solution containing a small amount of sodium sulfite.

5. The method of claim 2 wherein the protein extracting agent is sodium sulfite.

6. In a method for isolating, from soybean material, a substantially unhydrolyzed protein characterized by relatively low viscosity and a low insoluble residue when dispersed in mild alkaline solutions, the steps which comprise treating the substantially oil-free protein-containing soybean material at a pH up to 10.5, with a solution of sodium hydroxide containing from about 0.5 to 2.0% sodium sulfite by weight of the soybean material being treated, at a temperature in the range from 103° to 107° F., to extract the protein, separating the solids from the resultant slurry, adding to the separated solution in an amount from 0.5 to 2.0% by weight of the protein, an organic material selected from the group consisting of fatty acids containing from 10 to 18 carbon atoms, natural rosins, water-soluble soaps of said acids, water-soluble soaps of said natural rosins, and mixtures thereof, precipitating the protein from the solution by the addition of sulfuric acid to the isoelectric range of the protein, washing the precipitated protein curd and separating and drying the protein.

7. The process of claim 6 wherein the organic material added is a mixture of fatty acids derived from coconut oil.

8. The process of claim 6 wherein the organic material added is a mixture of fatty acids derived from cottonseed oil.

9. The process of claim 6 wherein the organic material added is a mixture of fatty acids derived from soybean oil.

10. The process of claim 6 wherein the organic material added is lauric acid.

11. The process of claim 6 wherein the organic material added is oleic acid.

12. The process of claim 6 wherein the organic material added is a natural rosin.

13. The process of claim 6 wherein the organic material added is the sodium soap of the mixture of fatty acids derived from coconut oil.

14. The process of claim 6 wherein the organic material added is myristic acid.

15. The process of claim 6 wherein the organic material added is the sodium soap of myristic acid.

16. The process of claim 6 wherein the organic material added is tall oil.

References Cited in the file of this patent

UNITED STATES PATENTS

| | | |
|---|---|---|
| 2,431,993 | Davidson | Dec. 2, 1947 |
| 2,451,659 | Calvert | Oct. 19, 1948 |
| 2,534,227 | Calvert | Dec. 19, 1950 |
| 2,534,228 | Calvert | Dec. 19, 1950 |